United States Patent
George et al.

(10) Patent No.: US 10,972,364 B2
(45) Date of Patent: Apr. 6, 2021

(54) USING TIERED STORAGE AND ISTIO TO SATISFY SLA IN MODEL SERVING AND UPDATES

(71) Applicant: Cisco Technology, Inc., San Jose, CA (US)

(72) Inventors: Johnu George, San Jose, CA (US); Amit Kumar Saha, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 22 days.

(21) Appl. No.: 16/412,604

(22) Filed: May 15, 2019

(65) Prior Publication Data
US 2020/0366568 A1 Nov. 19, 2020

(51) Int. Cl.
*H04L 12/24* (2006.01)
*G06N 20/00* (2019.01)
*H04L 12/26* (2006.01)

(52) U.S. Cl.
CPC ......... *H04L 41/5009* (2013.01); *G06N 20/00* (2019.01); *H04L 41/16* (2013.01); *H04L 41/5019* (2013.01); *H04L 43/0817* (2013.01)

(58) Field of Classification Search
CPC . H04L 41/5009; H04L 41/5019; H04L 41/16; H04L 43/0817; G06N 20/00
See application file for complete search history.

(56) References Cited

U.S. PATENT DOCUMENTS

| | | | |
|---|---|---|---|
| 8,429,097 B1* | 4/2013 | Sivasubramanian | ................. G06F 16/2282 706/12 |
| 9,413,619 B2* | 8/2016 | Akolkar | ................. H04L 47/70 |
| 10,097,634 B1* | 10/2018 | Gorantla | ................. G06F 3/061 |
| 10,235,055 B1* | 3/2019 | Saad | ................. G06F 3/0617 |
| 2002/0194324 A1* | 12/2002 | Guha | ................. H04L 43/00 709/223 |
| 2016/0283538 A1* | 9/2016 | Barber | ................. G06F 16/2255 |
| 2017/0206107 A1* | 7/2017 | Guha | ................. G06F 3/0647 |

FOREIGN PATENT DOCUMENTS

| WO | 2015106795 A1 | 7/2015 | |
| WO | WO-2015106795 A1 * | 7/2015 | ........... H04L 47/823 |

* cited by examiner

*Primary Examiner* — Michael C Lai
(74) *Attorney, Agent, or Firm* — Polsinelli PC

(57) ABSTRACT

Systems, methods, and computer-readable storage media are provided for storing machine learned models in a tiered storage. The model serving network evaluates where the models should be stored based on the model corresponding service level agreement. The model is generally stored at the lowest tiered storage device that is still capable of satisfying the model's service level agreement. In this way, the model serving network aims to store data that achieves the cheapest cost.

20 Claims, 4 Drawing Sheets

100

110           120           130

300

- 310 Define Service Level Agreements for models
- 320 Evaluate network conditions
- 330 Store machine learned models in tiered storage based on SLAs
- 340 Receive inference request
- 350 Receive updates
- 360 Re-assign machine learned models

FIGURE 3

USING TIERED STORAGE AND ISTIO TO SATISFY SLA IN MODEL SERVING AND UPDATES

TECHNICAL FIELD

The subject matter of this disclosure relates in general to the field of machine learning and artificial intelligence, and more particularly, to systems and methods for using tiered storage and ISTIO to satisfy service level agreements (SLAs) in model serving and updates.

BACKGROUND

Machine learning, a subset of artificial intelligence, pertains to computer system usage of algorithms and statistical models in order to perform specific tasks without explicit instructions. Machine learning is used in a variety of different present day applications such as email filtering and computer vision. In each of these examples, it is impractical to develop specific instructions used to carry out a particular task given the wide possible situations that can arise that have to be evaluated and addressed. Instead, the computer system uses patterns and inference instead in order to generate instructions for carrying out tasks based on current available data (e.g. inputs/outputs).

Machine learning occurs in a variety of different manners. In supervised learning, an algorithm builds a model from a set of data that contains both inputs and outputs. In unsupervised learning, the algorithm builds a model from a set of data that contains only inputs. Through unsupervised learning, patterns in the data can be discovered and the group of inputs can be categorized accordingly. Lastly, active learning accesses involve querying a user to obtain desired outputs in connection with some inputs.

Once a model has been generated the models can then be used by various applications to perform tasks. Serving machine learning models is the process of taking a trained model (generated above through machine learning) and making it available to serve prediction requests, for example, with email filtering and computer vision.

Service level agreement (SLA) is a contract between a service provider and the end user that defines the level of service expected from the service provider. Service level agreements tend to be output-based since they relate to the customer experience and what they will receive. Service level agreements may focus on different aspects of service including quality, availability, and responsibilities.

ISTIO is an open source independent service mesh that provides features needed to run a distributed microservice architecture. ISTIO reduces complexity of managing microservice deployments by providing a uniform way to secure, connect, and monitor microservices. For example, ISTIO allows creation of networks with various features such as load balancing, service-to-service authentication, and monitoring without requiring changes to service code.

BRIEF DESCRIPTION OF THE FIGURES

To provide a more complete understanding of the present disclosure and features and advantages thereof, reference is made to the following description, taken in conjunction with the accompanying drawings, in which:

FIG. 3 illustrates an example method for storing models according to an aspect of this disclosure;

OVERVIEW

Figure 1:
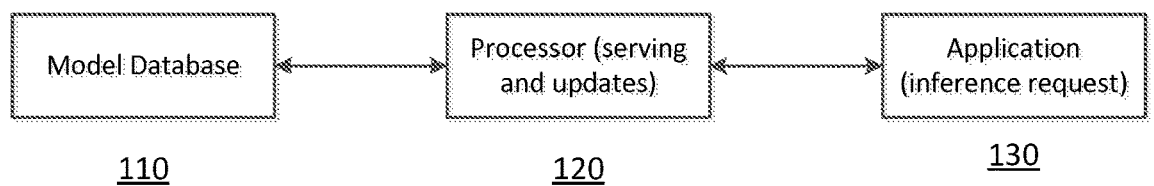
FIG. 1 illustrates an example model serving network.

Disclosed herein are computer-implemented methods, computer-readable media, and systems for providing tiered storage of machine learned models. The methods, computer-readable media, and systems include initially defining service level agreements for a plurality of models, the service level agreements indicating pre-defined access times for each model of the plurality of models for a model serving network. Afterwards, the network conditions are evaluated so as to determine whether the service level agreements for the plurality of models can be met. Based on the evaluation, each of the plurality of models are stored into a respective storage tier. The specific storage tier for a model that is chosen would be based on the service level agreement of the model and the evaluated network conditions that would allow satisfaction of the service level agreement for the model.

In a further embodiment, the computer-implemented methods, computer-readable media, and systems would receive an inference request from an application that requires access to one or more of the stored models. The network conditions would be monitored as the inference request is being completed. The monitoring would be used to determine if the service level agreements for the one or more models are being satisfied.

In a further embodiment, the computer-implemented methods, computer-readable media, and systems would also allow for the re-assigning of the one or more models from a current storage tier to a lower storage tier. The re-assignment would still satisfy the service level agreement. The re-assignment would be based on the monitored network conditions.

In a further embodiment, the computer-implemented methods, computer-readable media, and systems would also allow for the re-assigning the one or more models from a current storage tier to a higher storage tier. The re-assignment would still satisfy the service level agreement. The re-assignment would be based on the monitored network conditions.

In a further embodiment, the computer-implemented methods, computer-readable media, and systems would also allow for re-assigning the one or more models across multiple storage devices within the same storage tier. The re-assignment would be based on the monitored network conditions.

In a further embodiment, the computer-implemented methods, computer-readable media, and systems would have at least three different storage tiers. Each of the storage tiers may use a different type of storage device for each tier. For example, the three different storage tiers include a first lower tier that uses hard disk drives, a second middle tier that uses solid state drives, and a third high tier that uses persistent memory. Furthermore, each tier may have a plurality of storage devices that corresponds to the type of storage device associated with that tier.

In a further embodiment, the computer-implemented methods, computer-readable media, and systems would utilize ISTIO in connection with the transmission of data within the model serving network. ISTIO would also be used to evaluate the network conditions.

In a further embodiment, the computer-implemented methods, computer-readable media, and systems would have service level agreements for the plurality of models associated with the model serving network be stored in a service level agreement database associated with the model serving network.

DESCRIPTION OF EXAMPLE EMBODIMENTS

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Example Embodiments

FIG. 1 illustrates an example model serving network 100. The example model serving network 100 includes three elements, a model database 110 where the machine learned models are stored, a processing unit 120 that performs the model serving and updating of the models, and an application requesting an inference 130 in connection with performance of a task. The processing unit 120 and the application requesting an inference 130 may be associated with the same or different computing devices.

The processing unit 120 can correspond to a container environment (e.g. kubernetes) which is used to train and run machine learned models. The processing unit 120 can also be used to serve the machine learned models from the model database 110 to the corresponding application 130. By providing the application 130 the machine learned models, the application (via the artificial intelligence or machine learning) will be able to make predictions and generate associated instructions for the application to carry out tasks that involve the models (e.g. computer vision) using the machine learned model.

Generally when the application 130 requests an inference, the application 130 sends the request to the processing unit 120 for a corresponding machine learned model stored within the model database 110. The requested inference requires the processing unit 120 to access the model database 110 in order to access the stored models. Once accessed, the processing unit 120 may need to read data structures and perform various operations (e.g. convolutions) in order to access and utilize the machine learned models stored within the model database 110.

The use of single type of memory (e.g. model database 110) to store all the models has some disadvantages. For example, there may be machine learned models that are stored within the model database 110 that have since been updated and a newer version generated and used in its place. The older machine learned models are not subsequently used (or not used as often). Therefore, the older machine learned models are taking up space within the model database 110 (since it is not ideal to delete older models just in case the older models need to be used). Depending on the type of memory being used and its associated cost, adding additional sources of memory (e.g. scaling the model serving network 100) may not be feasible.

Since there is a single type of memory, each of the models is presumably stored with the same level of importance and access. The processor would be able to access older machine learned models similarly compared to newer machine learned models. There is no way of customizing prioritized access of newer models in order to satisfy more strict service level agreements that require the model serving network 100 to provide a particular experience for the user (e.g. completion of a task within a pre-determined period of time).

Although cheaper memory can be used in order to provide increased storage (e.g. scaling feature) for the model serving network 100), this may sacrifice the performance of the model serving network 100. In contrast, solely using more expensive memory in order to provide quality performance may be cost prohibitive depending on how much memory is needed. Therefore, there is a need for an architecture that is capable of incorporating the benefits of cheaper memory (e.g. hard disk drive) and more expensive memory (e.g. persistent memory) in order to 1) provide flexibility on how the architecture can be made scalable and 2) prioritize different machine learned models based on their corresponding service level agreement requirements so that each machine learned models associated with higher service level agreement requirements can be differentiated from models that are used less frequently or have lower requirements associated with their service level agreements.

Figure 2:
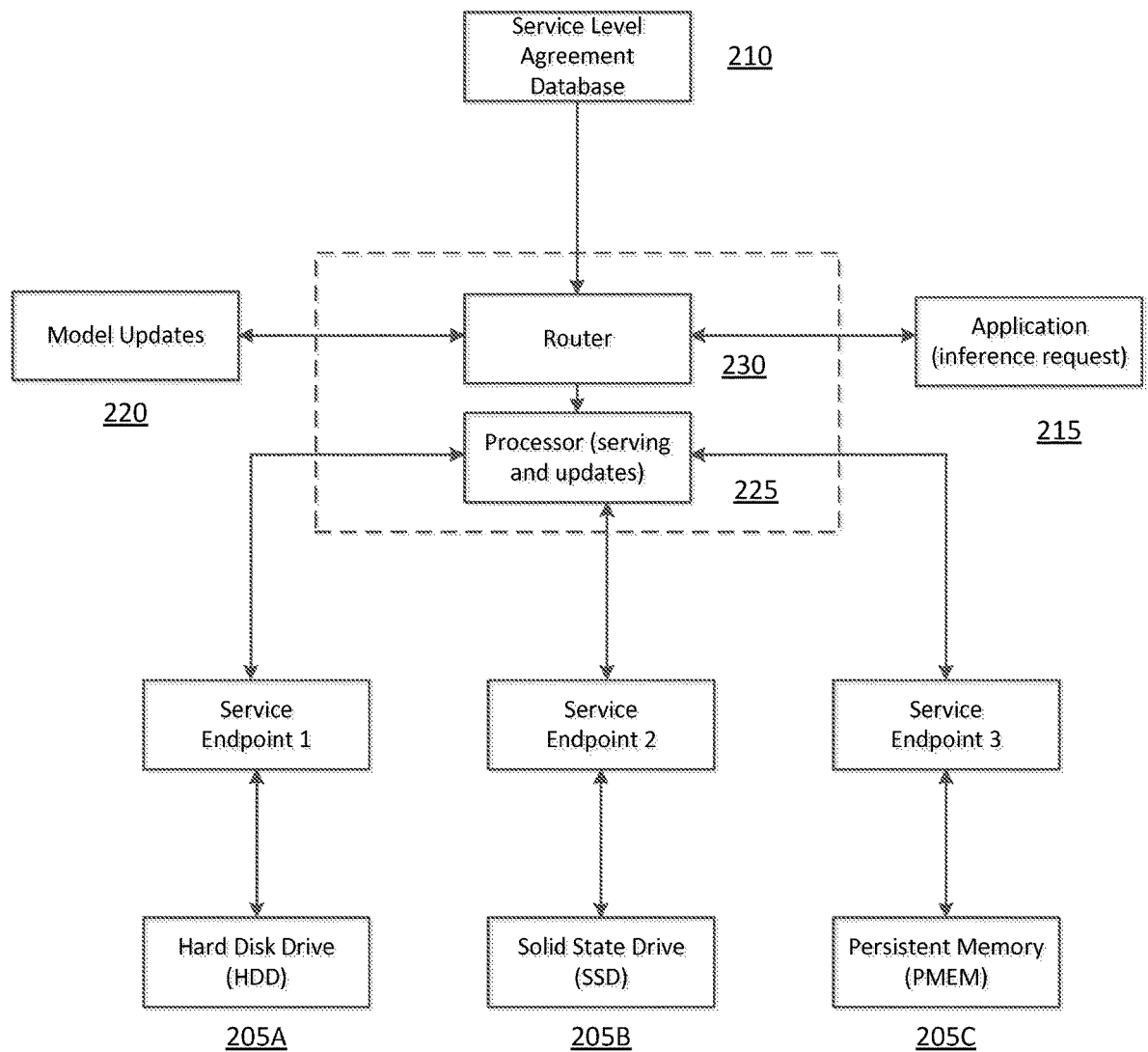
FIG. 2 illustrates an example model serving network in accordance with an embodiment applying the principles of this disclosure.

FIG. 2 illustrates an example model serving network 200 in accordance with an embodiment applying the principles of this disclosure. To address the issues described above in FIG. 1 surrounding the use of a single type of memory to store all the machine learned models, the figure illustrates the use of different tiered storage 205 to provide different types memory used to store the machine learned models. The machine learned models can be stored in a corresponding tiered storage 205 based on, for example, their corresponding service level agreement.

As illustrated in the figure, the tiered storage 205 may include three different types of storage, each with different access characteristics. Generally, the memory will be assigned tiers relative to the other memory being used whereby the memory that provides the fastest access would be assigned the highest tier while the memory that provides the slowest access would be assigned the lowest tier. For example, tiers associated with the model serving network 200 from lowest to highest (as illustrated in the figure) would include Hard Disk Drive (HDD), Solid State Drive (SDD), and Persistent Memory (PMEM). It should be noted that more or less different types of memory can be used. Furthermore, there may be one or more of each type of memory being used with the model serving network 200 (e.g. 5 different hard disk drives, 10 solid state drives, 3 persistent memory). Lastly, there may be different types of memory compared to the ones described herein and illustrated in the figure.

Generally, the tiered storage 205 may include a high level tier (which in this case is the persistent memory) which provides the quickest access time (e.g. lower latencies) for data stored therein (which in this case are the machine learned models) compared to lower tiered memory (e.g. solid state drives and hard disk drives) being used in the model serving network 200. Although it may be desirable to have all machine learned models stored within the high tiered storage (e.g. persistent memory) so that the lowest latencies are possible for each application requesting use of the models stored therein, the cost of using high tiered storage (e.g. persistent memory) as well as incorporating additional sources of high tiered storage (e.g. persistent memory) when scaling the model serving network 200 may be prohibitive compared to use of the lower tiered memory (e.g. solid state drives and hard disk drives).

Although the lower tiered memory (e.g. solid state drives and hard disk drives) may have lower performance than the higher tiered memory (e.g. persistent memory), the cost of using lower tiered memory would be lower. The lower cost may translate over to allowing an enterprise to spend less on running and scaling their model serving network 200. Lower tiered memory would be acceptable so long as data stored therein can be assessable to carry out tasks (e.g. inference request) and still satisfy corresponding service level agreements stored within the service level agreement database 210.

The purpose for using the tiered storage 205 is so that different service level agreements (SLAs) can be met. Service level agreements generally define a level of expected service that a service provider (e.g. application) seeks to provide to a user. The different service level agreements for each model stored in the model serving network 200 can be stored in a service level agreement database 210. The service level agreements stored within the service level agreement database 210 may be referred to when needed; for example when models are first evaluated based on their respective service level agreements to determine where to store the models (e.g. which tier of memory). In another scenario, the service level agreements may be referred to by the model serving network 200 when a higher tiered memory has run out of space requiring one or more models to be re-located to a lower tiered memory in order to make space, for example, for newer models having more restrictive (e.g. requiring lower latencies) service level agreements.

An exemplary service level agreement stored within the service level agreement database 210 may define an acceptable latency between a user request to perform a task and when the results of those tasks are outputted via the application on the user device. Although one may want to ideally have all the models stored in the highest tiered memory so that access and use of the data can be quick (e.g. low latency) thereby satisfying even the strictest of service level agreements, the limited amount of storage as well as the high cost of using higher tiered memory can be prohibitive. Therefore, if a cheaper, lower tiered memory could still be used to satisfy service level agreements, the present invention aims to delegate storage of those models to the lower tiers.

The service level agreements database 210 is referred to in order to ensure that the model serving being performed based on the inference requests 215 provided from users via the applications are being carried out on a satisfactory basis. Furthermore, the service level agreement database 210 can also be referred to in order to provide corresponding updates to service level agreements for models being updated via the model updates module 220. The model updates module 220 may provide updates (e.g. modifications) to one or more machine learned models stored within the tiered storage 205. As models become updated, their corresponding service level agreements can be updated as well, for example, to provide more strict constraints (e.g. lower latency requirements) for more recent models while lessening the restrictions for older models. Based on the updated service level agreements, the location where each model that was previously stored may be shifted up or down a tier. For example, a model that was originally stored in the highest tier (e.g. persistent memory) may be moved to the next lower tier (e.g. solid state drive) since an updated model can now be stored in the highest tier.

In one embodiment, as described in the present application, routing of the service level agreements and the models as well as monitoring of the network conditions associated with the model serving network 200 can be performed using ISTIO. ISTIO utilizes a service mesh that can be used to run a distributed microservice architecture. ISTIO provides various features that facilitate the functions of the model serving network 200. For example, ISTIO is able to intelligently control the flow of traffic and API (application programming interface) calls between services, conduct tests, and be upgraded. ISTIO can also provide automatic security for services through the use of authentication, authorization, and encryption. ISTIO can provide resource-related policies and ensure that these policies are enforced so that the resources can be distributed appropriately. Lastly, ISTIO provides automatic tracing and monitoring features. With respect to the monitoring features, the model serving network 200 can utilize ISTIO to observe network conditions and subsequently adjust where models should be stored in connection with fulfilling their respective service level agreements.

Although ISTIO can be utilized, there may be other possible services and methods that are also capable of being implemented to carry out the monitoring and tracking of the models and the service level agreements within the model serving network 200. Generally, the model serving network 200 utilizes a processor 225 and router 230 to perform the model serving as needed. The processor 225 is used to perform a number of different functions, for example, finding and retrieving requested models from the tiered storage, monitoring the network conditions and evaluating whether the service level agreements of a model is being satisfied, and determining where the models (or updated models) should be stored. The router 230 is used to transmit and receive the models within the model serving network 200. For example, the router 230 can receive an inference request from an application 215 for a model that is stored in one of the tiered storage 205. Communication with the storage devices associated with the tiered storage 205 occurs at their respective service endpoints. The router 230 can then be used to transmit the retrieved model from the tiered storage 205 back to the application 215. Similarly, any updates to models stored within the tiered storage 205 can also be transmitted to the tired storage 205 and stored. The router 230 can also be used to retrieve corresponding service level agreements stored within the service level agreement database 210 to be checked to ensure that performance associated with the models are being satisfied.

FIG. 3 illustrates an example method 300 for storing models according to an aspect of this disclosure. For illustrative purposes, the example method 300 will be described with respect to using machine learned models for computer vision in detecting and identifying different objects (e.g. facial recognition).

In step 310, the model serving network may define service level agreements for different applications and their respective machine learned models. The service level agreements will, for example, define a level of performance that will be provided to the user when using that application in connection with the machine learned models. The performance can be based on, for example, latency/access speeds which translates to how fast the application will be able to retrieve and use a model in order to provide an output in response to a user inference request.

In an example situation, different service level agreements may be defined for the models stored within a model serving network where the application is used to identify different objects captured in an image. The application utilize the models in connection with machine vision in order to provide a computing device the capability of identify what object is illustrated in the image. The service level agreements can define how fast the user should expect to response a response after providing a request to the application identifying the object in the image.

It should be noted that there may be different service level agreements for different models stored within the model serving network. Each of the models would correspond to different algorithms and parameters that would be useful in evaluating what object appears in the image. When an image is evaluated using the model, the algorithms and parameters would be used to specifically identify the object so that the application provide an output (e.g. identification of the object). As models become updated (e.g. modified, tuned), older versions of the models may not be used as frequently. Similarly, newer versions of models may be relied on more frequently. As such, the service level agreements for corresponding models can correspond to their frequency of use. Other factors that may influence the different service level agreements for the models, for example how fast the models should be accessed, may also include the complexity of the calculations needed in connection with the model to identify the object, user preference, or the application.

Once the service level agreements have been defined for each model, the model serving network can evaluate the network conditions in step 320. The evaluation is performed by monitoring, for example, the time between a user inference request and a received output at the application (e.g. latency). The purpose of the evaluation is to identify the overall performance of the model serving network and whether service level agreements for the models being requested and used are being satisfied in connection with the application.

Once the service level agreements for the models have been defined (in step 310) and the network conditions have been evaluated (in step 320), the model serving network can then identify where each of the models can be stored (in step 330). In an exemplary model serving network with different tiers of storage, the goal is to store the models in the lowest possible tier while still satisfying that model's service level agreement. This would achieve the feature of storing the data used in the model serving network as cheaply as possible.

The model serving network may initially attempt to store the model in the lowest tier possible and evaluate whether that tier would still allow the model to be accessed in a manner that would satisfy its service level agreement. If the service level agreement is satisfied, the model serving network has identified the proper place to currently store the model. However, if the service level agreement was not satisfied at the lowest tier, then the model serving network would upgrade the tier for storing the model to the next highest tier. A subsequent evaluation is performed to determine if this next tear satisfies the models' service level agreement. The evaluation and moving of the model is repeated for each possible tier until the model can be stored in a tier that satisfies the service level agreement.

In another embodiment, identifying which tier a model can be stored in can also be initiated from the highest tier or some other tier in the middle of all possible tiers. The evaluation and movement of the model can be performed as above to identify where the model should be stored. For example, if the evaluation determines that the service level agreement can be met, it may be desired to move the model to a lower tier until the service level agreement is not met. In which case the last tier for which the service level agreement was met is where the model should be stored.

There may be situations where storage of a model in any storage tier may not satisfy the service level agreement for that model. To address this situation, the model serving network may attempt to store the model in multiple different storage devices. The model may be stored within the same tier or different tiers. The purpose of storing the model in multiple storage devices would allow additional opportunities/sources for the model to be accessed when resolving inference requests.

In an example of such implementation, there may be multiple models used to identify the object. These models may initially be stored within the same tiered storage device but would not be capable of satisfying its corresponding service level agreement. A solution could be to have a first subset of models be stored in one storage device while other models can be stored in different storage devices. The inference request can then be provided to each of these different storage devices. This allows the inference request to be completed more quickly compared to the situation of having a single inference request access all the models within the same storage device.

Even with all these adjustments, if the service level agreement for a model is still not capable of being met, this may be indicative that there could be a configuration issue that would need to be addressed with respect to the application or the overall model serving network. The service level agreement for the model may also be too strict for the model serving network to be possibly satisfied. In these situations, it may be necessary to accept that the model and its associated service level agreement cannot be satisfied and the model serving network has to try and do its best to achieve the service level agreement.

In step 340, an inference request is received from an application associated with the model serving network. The inference request corresponds to a user action with the application that requires the use of one or more models stored within the tiered storage. As described above, an exemplary inference request is a user request to identify an object found within an image. The model serving network would utilize the models stored within the tiered storage in order to identify the models used to evaluate the image and output the identity of the object.

In step 350, updates to the models stored within the tiered storage can be received. These updates can be provided, for example, by users or via processing performed in connection with the application (e.g. artificial intelligence, machine learning). The updates received in step 350 may update existing models in a number of different ways. For example, the updates may modify parameters or algorithms associated with models to allow the application to perform tasks more efficiently. In one scenario, a model could be used to calibrate the operation of an application or computing device with the algorithms or parameters associated with the model used to instruct the application or computing device on how to perform its task.

Furthermore, the updates received in step 350 may modify parameters or algorithms associated with models to create different versions of the model for the purpose of carrying out different tasks. For example, a base model may be used to identify a genre of objects (e.g. facial features, cars, flowers). Different versions of the same model may be created from the received updates (in step 350) in order to identify specific types of objects within that genre (e.g. ethnicity of the person, types of cars, types of flowers) that may be based on different variation sin the features associated with the genre of objects.

The model serving network may opt to re-assign where models can be stored within the tiered storage in step 360 for a number of different reasons. For example, the service level agreement for models may be modified over time in which case, the model may be moved up or down tiers until the model is stored at the lowest possible tier that still allows the modified service level agreement for that model to be satisfied. As newer versions of models are introduced to the model serving network, older versions may have their service level agreements modified. For example, models that are more frequently accessed may have service level agreements that require shorter access times while models that are less frequently accessed may have service level agreements that allow for longer access times. The models can then be re-assigned to different storage tiers based on their respective service level agreements Furthermore, as additional models are added to the tiered storage, there may be situations where the total capacity of a storage device within a tier reaches capacity. In which case, the model serving network would need to identify one or more models within the same storage device that would need to be moved to a different storage device on a different (e.g. lower tier). The determination of which one or more models would be chosen to be moved in order to make room for newer models can be based, for example, on a ranking of importance/priority of the models stored within the tiered storage device. Models that are ranked higher in importance or priority may be allowed to stay in the current tiered storage while those other models that are lower may be forced to be re-assigned to a different tiered storage device.

Another way to choose which models would be moved would be based on the ranking of importance/priority of the applications associated with the model serving network that would use the models stored within the tiered storage. If application A is ranked higher priority than application B, the models associated with application A may be allowed to stay within the tiered storage while models associated with application B may be moved to a different tiered storage.

Figure 4A:
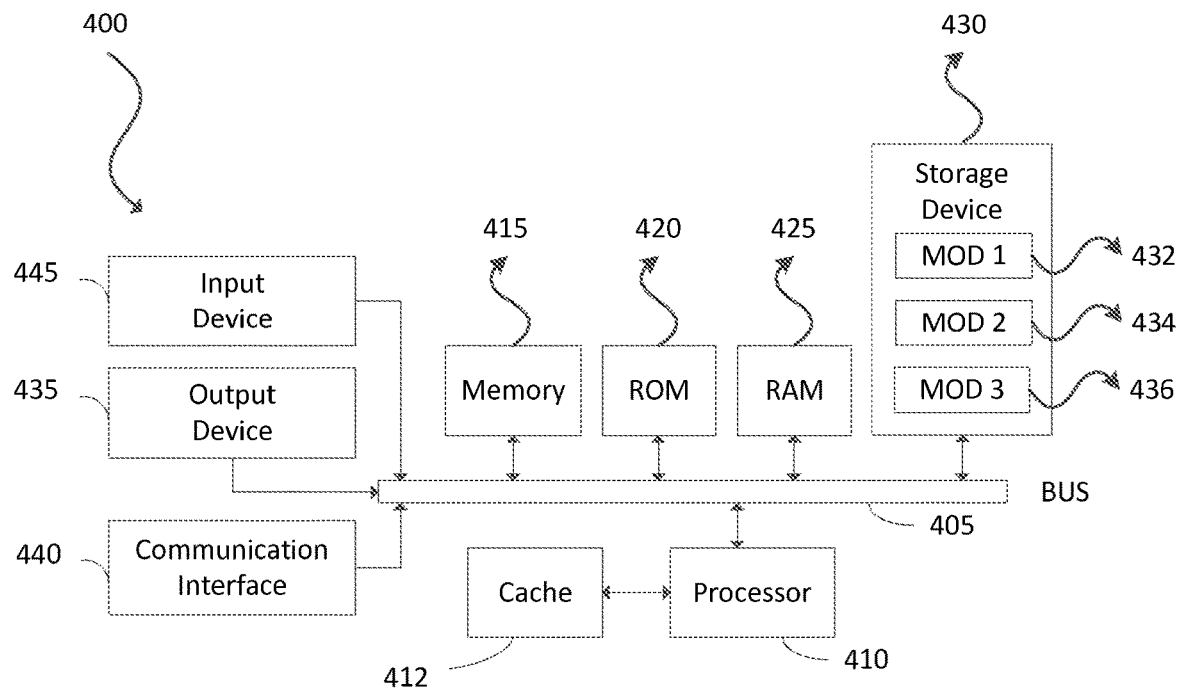
FIG. 4A and FIG. 4B illustrate examples of systems in accordance with some embodiments.
Figure 4B:
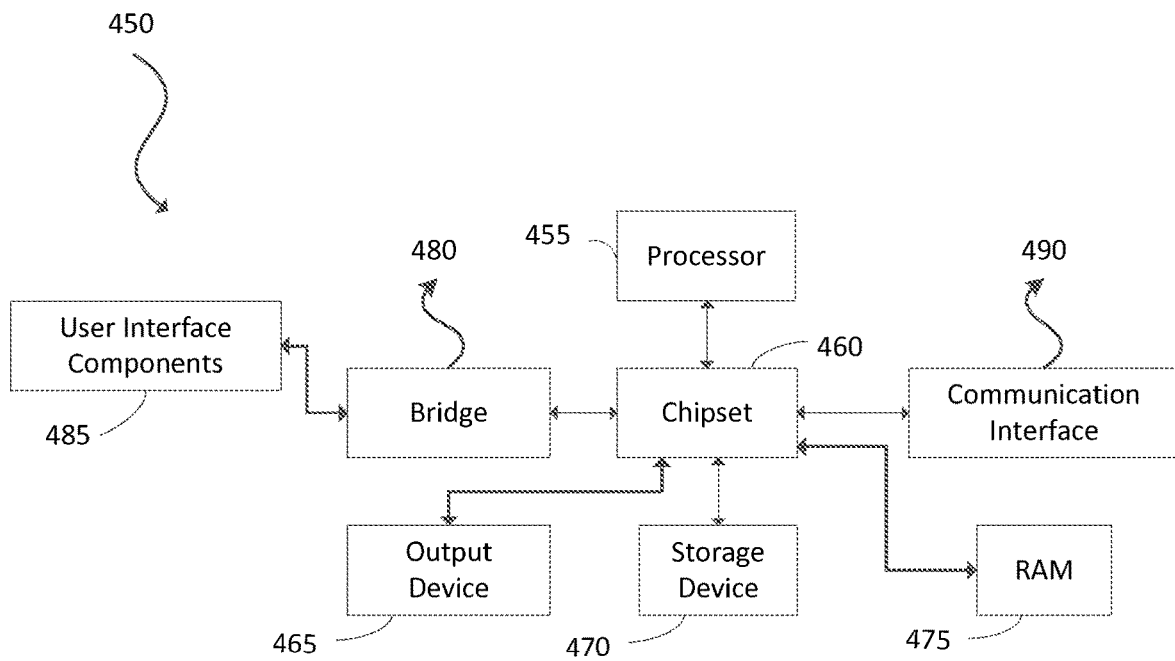

FIG. 4A and FIG. 4B illustrate examples of systems in accordance with some embodiments. For example, the illustrated systems may correspond to computing devices associated with the model serving network illustrated in FIG. 2. The more appropriate system will be apparent to those of ordinary skill in the art when practicing the various embodiments. Persons of ordinary skill in the art will also readily appreciate that other systems are possible.

FIG. 4A illustrates an example of a bus computing system 400 wherein the components of the system are in electrical communication with each other using a bus 405. The computing system 400 can include a processing unit (CPU or processor) 410 and a system bus 405 that may couple various system components including the system memory 415, such as read only memory (ROM) 420 and random access memory (RAM) 425, to the processor 410. The computing system 400 can include a cache 412 of high-speed memory connected directly with, in close proximity to, or integrated as part of the processor 410. The computing system 400 can copy data from the memory 415, ROM 420, RAM 425, and/or storage device 430 to the cache 412 for quick access by the processor 410. In this way, the cache 412 can provide a performance boost that avoids processor delays while waiting for data. These and other modules can control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in the storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing system 400, an input device 445 can represent any number of input mechanisms, such as a microphone for speech, a touch-protected screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing system 400. The communications interface 440 can govern and manage the user input and system output. There may be no restriction on operating on any particular hardware arrangement and therefore the basic features here may easily be substituted for improved hardware or firmware arrangements as they are developed.

The storage device 430 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 430 can include the software modules 432, 434, 436 for controlling the processor 410. Other hardware or software modules are contemplated. The storage device 430 can be connected to the system bus 405. In some embodiments, a hardware module that performs a particular function can include a software component stored in a computer-readable medium in connection with the necessary hardware components, such as the processor 410, bus 405, output device 435, and so forth, to carry out the function.

FIG. 4B illustrates an example architecture for a chipset computing system 450 that can be used in accordance with an embodiment. The computing system 450 can include a processor 455, representative of any number of physically and/or logically distinct resources capable of executing software, firmware, and hardware configured to perform identified computations. The processor 455 can communicate with a chipset 460 that can control input to and output from the processor 455. In this example, the chipset 460 can output information to an output device 465, such as a display, and can read and write information to storage device 470, which can include magnetic media, solid state media, and other suitable storage media. The chipset 460 can also read data from and write data to RAM 475. A bridge 480 for interfacing with a variety of user interface components 485 can be provided for interfacing with the chipset 460. The user interface components 485 can include a keyboard, a microphone, touch detection and processing circuitry, a pointing device, such as a mouse, and so on. Inputs to the computing system 450 can come from any of a variety of sources, machine generated and/or human generated.

The chipset 460 can also interface with one or more communication interfaces 490 that can have different physical interfaces. The communication interfaces 490 can include interfaces for wired and wireless LANs (Local Area Networks), for broadband wireless networks, as well as personal area networks. Some applications of the methods for generating, displaying, and using the technology disclosed herein can include receiving ordered datasets over the physical interface or be generated by the machine itself by the processor 455 analyzing data stored in the storage device 470 or the RAM 475. Further, the computing system 450 can receive inputs from a user via the user interface components 485 and execute appropriate functions, such as browsing functions by interpreting these inputs using the processor 455.

It will be appreciated that computing systems 400 and 450 can have more than one processor 410 and 455, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB (Universal Serial Bus) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A method comprising:
   defining service level agreements for a plurality of models, the service level agreements indicating pre-defined access times for each model of the plurality of models for a model serving network, wherein the pre-defined access times for each model specify how fast one or more applications can retrieve and use each model;
   evaluating network conditions to determine whether the pre-defined access times for each model, as indicated by the service level agreements for the plurality of models, can be met;
   storing each of the plurality of models into a respective storage tier, wherein the respective storage tier is chosen based on the service level agreement of each respective model of the plurality of models and the evaluated network conditions allowing satisfaction of the service level agreement for the model; and
   facilitating access to each respective model of the plurality of models in the respective storage tier in which each respective model of the plurality of models is stored.

2. The method of claim 1 further comprising:
   receiving an inference request from an application that requires access to one or more of the stored models; and
   monitoring the network conditions as the inference request is completed, the monitoring being performed to determine if the service level agreements for the one or more models are being satisfied.

3. The method of claim 2 further comprising re-assigning the one or more models from a current storage tier to a lower storage tier that still satisfies the service level agreements based on the monitored network conditions.

4. The method of claim 2 further comprising re-assigning the one or more models from a current storage tier to a higher storage tier that satisfies the service level agreements for the re-assigned models based on the monitored network conditions.

5. The method of claim 2 further comprising re-assigning the one or more models across multiple storage devices within the same storage tier based on the monitored network conditions.

6. The method of claim 1 further comprising:
   receiving an update for one or more of the stored models;
   updating the service level agreements of the one or more stored models to generate one or more updated models; and
   re-assigning the one or more of the updated models from one storage tier to another storage tier based on the updated service level agreements.

7. The method of claim 1, wherein a model serving network has at least three different storage tiers.

8. The method of claim 7, wherein the at least three different storage tiers use different types of storage devices for each tier.

9. The method of claim 8, wherein the three different storage tiers include a first lower tier that uses hard disk drives, a second middle tier that uses solid state drives, and a third high tier that uses persistent memory.

10. The method of claim 8, wherein each tier comprises a plurality of storage devices that corresponds to the type of storage device associated with that tier.

11. The method of claim 1, wherein transmission of data within the model serving network is performed using ISTIO.

12. The method of claim 11, wherein ISTIO facilitates in the evaluation of the network conditions.

13. The method of claim 1, wherein the service level agreements for the plurality of models associated with the model serving network are stored in a service level agreement database associated with the model serving network.

14. A system comprising:
a plurality of different storage tiers used to store models;
a processor; and
a computer-readable device storing instructions which, when executed by the processor, cause the processor to perform operations comprising:
defining service level agreements for a plurality of models, the service level agreements indicating a pre-defined access times for each model of the plurality of models for a model serving network, wherein the pre-defined access times for each model specify how fast one or more applications can retrieve and use each model,
evaluating network conditions to determine whether the pre-defined access times for each model, as indicated by the service level agreements for the plurality of models can be met,
storing each of the plurality of models into a respective storage tier, wherein the respective storage tier is chosen based on the service level agreement of each respective model of the plurality of models and the evaluated network conditions allowing the satisfaction of the service level agreement for the model, and
facilitating access to each respective model of the plurality of models in the respective storage tier in which each respective model of the plurality of models is stored.

15. The system of claim 14, wherein the instructions further causes the processor to:
receive an inference request from an application that requires access to one or more of the stored models; and
monitor the network conditions as the inference request is completed, the monitoring being performed to determine if the service level agreements for the one or more models are being satisfied.

16. The system of claim 15, further comprising re-assigning the one or more models from a current storage tier to a different storage tier that still satisfies the service level agreements based on the monitored network conditions.

17. The system of claim 14, wherein the instructions further causes the processor to:
receive an update for one or more of the stored models;
update the service level agreements of the one or more stored models to generate one or more updated models; and
re-assign the one or more of the updated models from one storage tier to another storage tier based on the updated service level agreements.

18. The system of claim 14, wherein the plurality of storage tiers includes a first lower tier that uses hard disk drives, a second middle tier that uses solid state drives, and a third high tier that uses persistent memory.

19. A computer-readable device storing instructions which, when executed by a computer device, cause the computer device to perform operations comprising:
defining service level agreements for a plurality of models, the service level agreements indicating a pre-defined access times for each model of the plurality of models for a model serving network, wherein the pre-defined access times for each model specify how fast one or more applications can retrieve and use each model;
evaluating network conditions to determine whether the pre-defined access times for each model, as indicated by the service level agreements for the plurality of models can be met;
storing each of the plurality of models into a respective storage tier, wherein the respective storage tier is chosen based on the service level agreement of each respective model f the plurality of models and the evaluated network conditions allowing the satisfaction of the service level agreement for the model;
facilitating access to each respective model of the plurality of models in the respective storage tier in which each respective model of the plurality of models is stored.

20. The computer-readable device of claim 19, wherein further instructions are stored that causes the computer device to:
monitor the network conditions during operation of the model serving network; and
re-assign the one or more models from a current storage tier to a different storage tier that still satisfies the service level agreement based on the monitored network conditions.

* * * * *